UNITED STATES PATENT OFFICE.

NATHAN SULZBERGER, OF NEW YORK, N. Y.

CATALYZER AND PROCESS OF MAKING SAME AND FOR EFFECTING CATALYTIC REACTIONS THEREWITH.

14,167. Specification of Reissued Letters Patent. Reissued July 18, 1916.

No Drawing. Original No. 1,143,332, dated June 15, 1915, Serial No. 820,874. Application for reissue filed May 4, 1916. Serial No. 95,509.

*To all whom it may concern:*

Be it known that I, NATHAN SULZBERGER, a citizen of the United States, residing at New York city, in the county and State of New York, have invented certain new and useful Improvements in Catalyzers and Processes of Making Same and for Effecting Catalytic Reactions Therewith, of which the following is a specification.

In all cases where catalyzers have been used, it has been found that their efficiency is increased, when such catalyzers are most finely distributed in the medium, which is to be treated. One of the methods for accomplishing such fine distribution is to impregnate an inert substance with the substance which is to be used as a catalyzer. As such inert substances have been proposed among others, kieselguhr, kaolin, asbestos and the like. The mode generally employed was to endeavor to saturate such substances with a solution, generally aqueous, of a substance, which was then brought into its catalytic form. Thus, for instance, kaolin was brought in contact with an aqueous solution of a nickel-salt, the product then subjected to a current of hydrogen, while being heated. It is necessary, of course, to have the kaolin in a finely divided condition, which requires time, labor and machinery; besides such substances lack purity and uniformity. I have found that a more complete, minute and much simpler method of finely dividing and spreading a catalytically efficient substance over an inert material containing, for example, silicon, silica or other compounds containing silicon, is by utilizing a chemical compound containing silicon and such substance, which is to be used as a catalyzer. By this method, since the original molecule contained both substances, the resultant product, which is to be catalytically employed, will be most intimately distributed among the silicon-containing substance. Thus the product described in the following example, even when brought to an impalpable powder of velvety feel, appears under the microscope black, due to its nickel-contents, in every particle.

As an illustration, I cite the following: An aqueous solution of a nickel-salt was treated with a solution of sodium-silicate. The precipitate was filtered off, dried and subjected to a current of hydrogen, while being heated. A black powder was obtained. This substance was used as a catalyzer, for instance, in hydrogenating oils, with which it can readily be mixed, remaining well in suspension, to which fact may be due that the product likely contains silicic acid also in a colloidal condition.

Various modifications of the above described illustration of my invention may be employed. Thus, in some cases, the reduction of the metal-silicate may be accomplished in solution by means, for instance, of hydrazin or some other reducing agent. Mixture of substances, as, for instance, of silicates: nickel silicate with small amounts of palladium, may be employed. All such and other modifications come under the scope of this invention, the fundamental idea of which is the utilization of a chemical combination *per se* or in mixture containing for example silicon and a metal, which is catalytically efficient.

The claims cover not only the particularly specified ingredient (silicate, silicates, silica impregnated with metal, etc.), but also all mixtures of same with substances, as will not destroy the use of product as a catalyst. By the term "free from anti-catalytic material" in claims: 1, 2 and 3, is meant, free from anticatalytic material and such amounts of same, as will destroy the catalytic action of the product. The word "hydrogen" in the following claims also includes mixtures containing this element, as well as all such other processes, which are effective reducing agents in consequence of their hydrogen contents.

It will be noted that the invention is characterized, as a process, by the reduction of a chemical compound of a metal possessing catalytic action and elements, such as those of an acid nature, forming a carrier or promoter therefor; and, as a product, by the unitary or atomistic nature of the reduced compound, the carrier not only being unitary with the catalytically active metal or metal compound, but serving as a promoter of the catalytic action. I believe it to be entirely new in the art, as above indicated, to thus produce a unitary catalyzer by reduction of a chemical compound of the metal or metals possessing catalytic action and a carrier or solid promoter therefor.

I claim:

1. A process of making a catalyst, which comprises reducing a silicate of a catalytic metal with a reducing agent free from anticatalytic material.

2. A process of making a catalyst, which comprises reducing a silicate of catalytic metals with a reducing agent free from anticatalytic material.

3. A process of making a catalyst, which comprises reducing nickel silicate with a reducing agent free from anticatalytic material.

4. Process of making a catalyst, consisting in reducing a silicate of a catalytic metal by means of hydrogen.

5. Process of making a catalyst, consisting in reducing a silicate of catalytic metals by means of hydrogen.

6. Process of making a catalyst, consisting in reducing nickel silicate by means of hydrogen.

7. Process of making a catalyst, consisting in precipitating a soluble salt of a metal possessing catalytic action with a soluble alkali silicate, and reducing the precipitate to a catalytically active form.

8. Process of making a catalyst, consisting in precipitating a soluble nickel salt with sodium silicate, and reducing the precipitate to a catalytically active form.

9. Product possessing catalytic action containing silica finely impregnated with metals possessing catalytic action, such impregnated silica being of uniform appearance under the microscope.

10. The method of preparing a catalyst, which comprises reducing a chemical compound of a metal possessing catalytic action and elements forming a solid promoter therefor; substantially as described.

11. The method of preparing a catalyst, which comprises co-precipitating a metal possessing catalytic action and a carrier therefor in the form of a chemical compound, and reducing the compound; substantially as described.

12. The method of preparing a catalyst, which comprises reducing a chemical compound of nickel and elements forming a solid promoter therefor; substantially as described.

13. The method of preparing a catalyst which comprises co-precipitating nickel and a carrier therefor in the form of a chemical compound, and reducing the compound; substantially as described.

14. The method of preparing a catalyst which comprises co-precipitating nickel and a carrier therefor in the form of a chemical compound, and reducing the compound to a uniform black product; substantially as described.

15. The method of preparing a catalyst, which comprises co-precipitating a metal possessing catalytic action and a carrier therefor of an acid nature in the form of a chemical compound, and reducing the precipitate to convert the metal into a catalytically active state without complete reduction of the carrier; substantially as described.

16. The method of preparing a catalyst, which comprises co-precipitating nickel and a carrier therefor of an acid nature in the form of a chemical compound, and reducing the precipitate to convert the nickel into a catalytically active condition; substantially as described.

17. The method of preparing a catalyst, which comprises reducing chemical compounds of metals possessing catalytic action and elements forming a promoter therefor; substantially as described.

18. The method of preparing a catalyst, which comprises reducing chemical compounds of metals possessing catalytic action and elements forming a promoter therefor, at least one metal being in chemical combination with elements of the promoter; substantially as described.

19. The method of preparing a catalyst, which comprises co-precipitating metals possessing catalytic action and a carrier therefor of an acid nature, one at least of the metals being in chemical combination with elements of the carrier, and reducing the precipitate to convert the metals into a catalytically active state; substantially as described.

20. The method of preparing a catalyst, which comprises co-precipitating nickel and palladium and a carrier therefor, one at least of the metals being in chemical combination with elements of the carrier, and reducing the precipitate to convert the metals into a catalytically active state; substantially as described.

21. The method of preparing a catalyst, which comprises co-precipitating nickel and palladium and a carrier therefor of an acid nature, one at least of the metals being in chemical combination with elements of the carrier, and reducing the precipitate to convert the nickel and palladium into a catalytically active state without complete reduction of the carrier; substantially as described.

22. The method of preparing a catalyst, which comprises co-precipitating a metal possessing catalytic action and elements forming a carrier therefor in the form of a chemical compound, and reducing the precipitate to a catalytically active state.

23. The method of preparing a catalyst, which comprises reducing precipitated silicate of nickel to a black catalytically active material of homogeneous appearance under the microscope.

24. The method of preparing a catalyst, which comprises reducing a precipitated silicate of a metal possessing catalytic action to a catalytically active state.

25. A catalyst adapted for use in the hydrogenation of oil comprising a reduction product of a chemical compound of a metal possessing catalytic action and a co-precipitated carrier therefor, said catalyzer being of a homogeneous nature and of uniform appearance under the microscope; substantially as described.

26. A catalyst comprising a chemical compound of a metal possessing catalytic action and a promotor therefor, reduced to a catalytically active state; substantially as described.

27. A catalyst comprising a chemical compound of a metal possessing catalytic action and a promotor therefor, reduced to a catalytically active metallic state; substantially as described.

28. A catalyst of a unitary nature comprising a reduction product of a chemical compound of a metal possessing catalytic action and a carrier therefor, said catalyst being of uniform appearance under the microscope; substantially as described.

29. A catalyst comprising a reduction product of a chemical compound of nickel with elements forming a carrier for the nickel when subjected to reduction; substantially as described.

30. A catalyst comprising a chemical compound of a metal possessing catalytic action and a carrier, reduced to a catalytically active state, said carrier being of an acid nature; substantially as described.

31. A catalyst adapted for use in the hydrogenation of oil comprising a reduction product of a chemical compound of nickel and a co-precipitated carrier therefor, said catalyzer being of a homogeneous nature and of uniform appearance under the microscope; substantially as described.

32. A catalyst comprising a reduction product of a chemical compound containing nickel in a black metallic state and a co-precipitated carrier therefor, said catalyzer being of a homogeneous nature and of uniform appearance under the microscope; substantially as described.

33. A catalyst of a unitary nature comprising a chemical compound of nickel and a promoter therefor, reduced to a catalytically active state; substantially as described.

34. A catalyst of a unitary nature comprising a chemical compound of nickel and a carrier therefor, reduced to a catalytically active state, said carrier being of an acid nature; substantially as described.

35. A catalyst comprising co-precipitated metals possessing catalytic action and a co-precipitated carrier containing silicon, said co-precipitated product being reduced to a catalytically active state; substantially as described.

36. A catalyst comprising co-precipitated nickel and palladium and a co-precipitated carrier therefor, said co-precipitated product being reduced to a catalytically active state; substantially as described.

37. A catalyst comprising co-precipitated nickel and palladium and a co-precipitated carrier therefor, said co-precipitated product being reduced to a catalytically active state, and said carrier being of an acid nature; substantially as described.

38. A catalyst comprising precipitated silicate of nickel reduced to a black catalytically active state.

39. A catalyst comprising a chemical compound containing silicon and a metal possessing catalytic action, reduced to a catalytically active state.

40. In the art of effecting catalytic reactions, the step which comprises bringing together the reacting materials in the presence of a catalytically active reduction product of a chemical compound of a metal possessing catalytic action and elements forming a carrier therefor.

41. In the art of effecting catalytic reactions, the step which comprises bringing together the reacting materials in the presence of a catalytically active reduction product of co-precipitated nickel and elements of an acid nature forming a carrier therefor.

42. In the art of effecting catalytic reactions, the step which comprises bringing together the reacting materials in the presence of a catalytically active reduction product of a precipitated metal silicate.

43. In the art of effecting catalytic reactions, the step which comprises bringing together hydrogen and oil to be hydrogenated in the presence of a catalytically active reduction product of a precipitated metal silicate.

44. In the art of effecting catalytic reactions, the step which comprises bringing together hydrogen and oil to be hydrogenated in the presence of a catalytically active reduction product of precipitated nickel silicate.

45. In the art of effecting catalytic reactions, the step which comprises bringing together the reacting materials in the presence of a catalytically active reduction product of precipitated nickel silicate.

NATHAN SULZBERGER.